(12) United States Patent
Gillet (10) Patent No.: US 8,312,869 B2
(45) Date of Patent: Nov. 20, 2012

(54) UNDERWATER HUNTING GUN OF THE CROSSBOW TYPE WITH EFFORTLESS STRING-DRAWING DEVICE AND LOW RECOIL

(76) Inventor: Jean-Claude Gillet, Porto Vecchio (FR)

( * ) Notice: Subject to any disclaimer, the term of this patent is extended or adjusted under 35 U.S.C. 154(b) by 446 days.

(21) Appl. No.: 12/294,503

(22) PCT Filed: Apr. 2, 2007

(86) PCT No.: PCT/FR2007/051051
§ 371 (c)(1),
(2), (4) Date: Jul. 1, 2010

(87) PCT Pub. No.: WO2007/116170
PCT Pub. Date: Oct. 18, 2007

(65) Prior Publication Data
US 2010/0288254 A1    Nov. 18, 2010

(30) Foreign Application Priority Data

Apr. 4, 2006 (FR) ...................................... 06 02928

(51) Int. Cl.
*F41B 7/04* (2006.01)

(52) U.S. Cl. ........................................ 124/20.3; 124/25

(58) Field of Classification Search .................. 124/20.1, 124/20.2, 20.3, 25
See application file for complete search history.

(56) References Cited

U.S. PATENT DOCUMENTS

| 3,006,330 | A | * | 10/1961 | De Bach | 124/22 |
| 4,290,407 | A | | 9/1981 | Damron | |
| 4,603,676 | A | * | 8/1986 | Luoma | 124/25 |
| 4,719,897 | A | * | 1/1988 | Gaudreau | 124/25 |
| 4,942,861 | A | * | 7/1990 | Bozek | 124/25 |
| 5,215,069 | A | * | 6/1993 | Liu | 124/25 |
| 5,931,145 | A | * | 8/1999 | Oviedo-Reyes | 124/20.3 |
| 6,913,007 | B2 | * | 7/2005 | Bednar | 124/25 |
| 7,100,590 | B2 | * | 9/2006 | Chang | 124/25 |
| 7,624,725 | B1 | * | 12/2009 | Choma | 124/25 |
| 2004/0074484 | A1 | | 4/2004 | Gillet et al. | |

FOREIGN PATENT DOCUMENTS

FR    926402    10/1947
FR    2 758623    7/1998

* cited by examiner

*Primary Examiner* — John Ricci
(74) *Attorney, Agent, or Firm* — Dennison, Schultz & MacDonald

(57) ABSTRACT

An underwater hunting gun of the crossbow type uses push-rods for tensioning elastic links, the push-rods being placed laterally on a moving headpiece activated by a lever-operated arming system. The elastic links run freely around the push-rods such that front ends of the elastic links are permanently and preferably fixed to the base and rear ends are fixed under no tension in a slot of a bolt or arrow. The sliding of the moving headpiece in the forward bolt-support segment intensifies the drawing of the elastic links from the back forwards over and under the push-rods, thus optimizing, at the time of firing, the range of the bolt without recoil of the crossbow through the fact that the bolt is expelled in the manner of a whiplash. The crossbow incorporates a power regulator and an arrow rail offering stealthy firing suited to the range to the target.

15 Claims, 3 Drawing Sheets

UNDERWATER HUNTING GUN OF THE CROSSBOW TYPE WITH EFFORTLESS STRING-DRAWING DEVICE AND LOW RECOIL

FIELD OF THE INVENTION

This present invention relates to the general field of underwater shotguns of the crossbow type with a stretching or string-drawing device, that is with lateral elastic propulsion elements commonly known as "bungees" or elastic cords. The elastic cords are hooked into to an arrow, such as into a notch located in the rear part of this arrow, and stretched by means of a mechanical action, in order to propel the arrow. The bungees advantageously support a shell that is intended to be positioned at the notch of the arrow and of which the role is to increase the inertia of the elastic cords when the gun is fired.

KNOWN PRIOR ART

The guns that are known from document WO02/052932 for example are composed of a butt extended by a longitudinal arrow support element, generally an arrow holder tube. The rear end of the longitudinal arrow support element can be built into the butt.

The assembly formed by the longitudinal arrow support element and the butt can also be a single part.

The gun is generally fitted with a locking mechanism at the rear end of the arrow and with a device for releasing the arrow, which is preferably a firing trigger.

This present invention more particularly concerns a stretching device for elastic propulsion means, composed of at least two lateral elastic cords of the bungee (elastic cord) type.

In the known guns, the elastic cords have two ends, the first of which is designed to be fixed onto fixing elements, and a second end that is designed to be hooked into at least one notch created in the rear part of the arrow. More particularly, in document WO 02/052932, the arrow support, which can be an arrow-holder tube for example, supports a mobile head part with fixing elements on which the first end of the elastic cords can be fixed, with the mobile head part being designed to slide along the length of the front part of the arrow support.

By positioning the mobile head part to the rear on the front part of the arrow support, pre-cocking thus becomes easy, that is with no tension force, by hooking the second end into the notch of the arrow.

Cocking the gun is then effected by a lever arm that mates with a rod by means of a thrust and retention device using the alternative buttressing effect of connecting rods. The rod drives the mobile head part in translation along the length of the arrow support.

The stretching of the elastic cords is then effected by a succession of pivoting movements of the lever arm that, by means of the mobile head part, stretch the elastic cords in a single direction from the rear to the front of the gun. This method reduces the large force required for cocking the gun.

However it is observed that many operations of the lever arm are necessary in order to cock the gun, and that the elastic tension achieved remains insufficient.

OBJECT AND SUMMARY OF THE INVENTION

The main purpose of this present invention is therefore to overcome such drawbacks by proposing an underwater shotgun of the crossbow type with a butt that includes a mechanism for locking the rear end of an arrow, a device for releasing the said arrow, a longitudinal arrow support element, elastic propulsion means including at least two lateral elastic cords, one end of which is designed to be hooked into at least one notch in the rear part of the arrow, characterised in that it includes a device for stretching the lateral elastic cords, including a cocking base fixed onto the longitudinal arrow support element, and with fixing elements intended to receive the first ends of the lateral elastic cords, and a mobile head part with thrust arms positioned laterally on the mobile head part, with the said mobile head part being designed to slide along the length of the arrow support element under the action of a system for moving the mobile head part between a rear position that, after passing around the thrust arms, enables the second ends of the elastic cords fixed at the cocking base to be placed, without tension, in the notch of the arrow, and a forward position in which, when they are hooked into the notch of the arrow, the elastic cords are stretched to the maximum by a stretching movement effected, during the movement of the mobile head part, at an intermediate part of the elastic cords passing around the thrust arms.

This new improved device for stretching the elastic propulsion means allows to increase the lengthening or the stretching of the elastic cords during the cocking action, when the mobile head part slides along the length of the front part of the arrow support element, between a rear position that allows the elastic elements to be placed without tension in the notch, and a forward position in which the elastic cords can be stretched to a greater or lesser extent to provide a required arrow propulsion power according to the distance at which the envisaged target is located. The thrust arms draw the elastic cords at an intermediate part and, thus double the stretch amplitude in terms of distance in relation to a stretch arrangement in one direction. By "intermediate part" is meant any part of the elastic cords located between the two ends, where the first is fixed to the cocking base and the second is attached to the arrow. The cocking force of the elastic cords is therefore increased for a given operation of the lever arm. This therefore results in either a greater cocking power, or in a reduction in the number of operating cycles of the lever that are necessary in order to obtain a given power level.

In the context of the invention, it is possible to arrange for permanent attachment of the first front end of the elastic cords on return from the thrust arms to the base.

In general, the cocking base is fixed onto the longitudinal arrow support element at its median part. It is advantageously recessed. It can also be incorporated directly onto the arrow support. In the latter case, the first end of the elastic cords is connected directly at a position that is more or less at the median of the arrow support.

It is also possible to arrange that the movement system should be mechanical, hydraulic or pneumatic.

In one advantageous method of implementation, this movement system is mechanical. The gun is then such that the device for stretching the lateral elastic cords includes a cocking base, fixed onto the longitudinal arrow support element, and that includes the fixing elements intended to receive the first ends of the lateral elastic cords, a mobile head part with thrust arms positioned laterally on the mobile head part and intended to receive the lateral elastic cords so that they can freely pass around the thrust arms in one direction above the thrust arms, to return in the other direction below the thrust arms, and designed to slide along the length of the arrow support element between a rear position that allows the second ends of the elastic cords fixed to the cocking base and accommodated in the thrust arms to be placed, without tension, in the notch of the arrow, and a forward position in which the elastic cords are stretched to the maximum when they are hooked into the notch of the arrow and accommodated in the thrust arms, where the movement system includes a rod, with the mobile head part being designed to slide along the length of the arrow support element by movement of the rod in its longitudinal direction, and a lever arm, where the lever arm fits onto the rod by means of a thrust and retention device that is used to move the rod in the longitudinal direction by a pivoting action of the lever arm, and to hold the rod in a forward position while the lever arm is returned to its initial position by reverse pivoting, so that it is thus possible to effect the stretching of the elastic cords by sliding of the mobile head part between the rear position and the front position by effecting at least one pivot action of the lever arm.

Such a mechanical cocking device is particularly suitable for use of the gun underwater. It is particularly robust in relation to the different stresses of the aquatic environment.

In one advantageous method of implementation, the elastic cords freely pass around the thrust arms, above from rear to front, and below when returning from front to rear.

Since the arrow is generally placed above the arrow support, such a configuration is particularly easy to manipulate. During the linear guidance of the mobile head part on the front segment of the arrow support, the elastic cords travel on the thrust arms and are stretched from the rear to the front above the thrust arms and from the front to the rear below the thrust arms. The consequence of this is to increase the stretching of the elastic cords for a given pivoting of the lever arm resulting in a reduction in the number of cycles necessary in order to obtain the maximum power in the elastic cords.

In addition, the fixing to the cocking base connects the front ends of the elastic cords on return from the thrust arms, and results in a resistive counter force of the elastic cords below the thrust arms, in opposition to the force for expulsion of the arrow by the elastic cords above the thrust arms. This results in eliminating the recoil of the gun during the firing action, achieved by a resistive "rear-front" counter force in opposition to the "front-rear" propulsion force of the arrow. This is a big advantage that is provided by the invention. It also gives more power and accuracy to the arrow.

The invention also enables one to extend the carry of arrow, by optimum accompaniment of the elastic cords over almost the whole length of the arrow support.

In fact, the fixing of the first end of the elastic cords on return to the cocking base, when the gun is fired after a full cocking action, allows total deployment of the elastic cords over almost the whole length of the arrow support. This provides optimum accompaniment of the arrow, producing more power, greater carry, and higher accuracy than is commonly available, when the front part of the elastic cords is fixed to the head of the arrow support, and propulsion of the arrow ends at the length of the elastic cords before stretching, which does not correspond to the length of the arrow support.

According to one advantageous characteristic of the invention, the dimensions of the elastic cords, and of a shell where appropriate, are matched to the distance between the fixing of the first end of the elastic cords and the thrust arms, so that at the moment of the expulsion of the arrow, the elastic cords return to their initial rest dimensions just after the total passing over of the thrust arms.

The dimensions of the elastic cords and of any shell are decisive in order to allow amplification of the propulsion power in the manner of a whiplash.

With this characteristic, the unusable distance for the release of the elastic cords is optimised. The objective is to allow total deployment of the elastic cords on the thrust arms during the firing action. Apart from optimisation of the kinetic energy, this allows optimum accompaniment of the arrow over the whole length of the rail located in the front part of the arrow support. One thus achieves greater carry of the arrow.

For example, one can choose the length of the elastic cords before stretching according to the length of the arrow support and the distance between the fixing of the first end of the cords and the thrust arms. During the firing action, the rear end of the elastic cords thus passes over the thrust arms at the moment when they attain their length before stretching. The elastic cords return instantaneously to their initial dimensions just after they have passed over the thrust arms at the end of the rail of the arrow support. If their length is suitable, they attain their length before stretching at the moment when they pass over the thrust arms. Up to this point, they have accompanied the trajectory of the arrow.

A maximum speed of propulsion at the release of the arrow is then reached by instantaneous transfer of inertia after passage of the second rear end of the elastic cords and of any shell over the thrust arms. Maximum kinetic energy is obtained. It is observed in fact that the kinetic energy is decoupled by means of a rotation transfer of force of the elastic cords in the manner of a whiplash, producing an amplified force for ejection of the arrow. The instantaneous transfer of whip inertia achieves a maximum angular speed. One thus amplifies the projection power of the arrow by an explosive action in the manner of a whiplash.

According to another advantageous characteristic of the invention, the gun is such that the notch on the arrow is oriented toward the longitudinal support when the arrow is inserted into the gun.

One thus improves the propulsion quality by expulsion with neither "buckling" nor deviation of the arrow during the whipped expulsion, by means of this new positioning of the notch, below the arrow rather than as commonly above. The release of the arrow is optimal, in that the arrow is released with no braking during the expulsion set off by the elastic cords, which then expand under the arrow, and which do not constrain it at the moment of its release, meaning when the elastic cords, and any shell, begin their rotation around the thrust arms.

Advantageously, after the firing action, the elastic cords do not pass below the arrow support during the firing action. Their motion is then stopped by the presence of the arrow support. Where necessary, the arrow support includes a specific shape intended to accommodate the attachment element on the arrow support.

Advantageously, the notch is located close to the centre of gravity of the arrow. This further favours the quality of the expulsion, particularly in relation to buckling and deviation of the arrow.

In fact, the invention gives greater latitude for the placement of the notch on the arrow, comparing to the mechanism of known guns. The propulsion accompaniment distance of the elastic cords, rendered greater by the possibility of a return of the elastic cords below the thrust arms on the base, without passing below the arrow support, makes it possible to substantially offset the notch of arrow toward its centre of gravity. One then observes an improvement of the propulsion quality, by expulsion of the arrow without "buckling" or curvature of the arrow. Such buckling is conventionally caused by attachment of the elastic cords at the rear end of the arrow, and by the application of excessive direct power in relation to the mass and length of the arrow to be moved.

According to a particular characteristic of the invention, the thrust and retention device includes thrust and retention connecting rods for the rod undergoing an alternating buttressing effect as a result of pivoting of the lever.

The thrust and retention connecting rods are used to move and hold the rod in a forward position corresponding to the movement distance of the rod resulting from the pivoting of the lever arm, while the lever arm is returned to its initial position by reverse pivoting.

According to an advantageous characteristic of the invention, the rod is designed to move in its longitudinal direction in a manner parallel to the longitudinal direction of the longitudinal arrow support element pushing the mobile head part.

According to one implementation, the mobile head part is designed to slide on a rail which is located in the front segment of the arrow support element, between a rear position that allows the elastic elements to be placed without tension in the notch, and a forward position in which the elastic cords are stretched to the maximum when they are hooked into the notch, so that cocking the elastic cords occurs parallel to the said arrow support and to the arrow.

With this characteristic, one obtains linear guidance in the longitudinal direction of the mobile head part.

The rail can be composed of a single tube or multiple tubes that are hollow or solid in any shapes capable of causing the mobile head part to slide.

According to the invention, the mobile head part can adopt various shapes to match the different possible arrow support structures. Thus, the mobile head part can, for example, take the shape of a skid fitted with rollers, which allows movement with no friction losses on the rail. It can also be composed of the thrust arms only, which themselves are designed to slide along the length of the arrow support.

In one advantageous method of implementation, the base of the rail, located in the front part of the arrow support, is complemented by a longitudinal platform, with the whole forming a section in the form of an inverted T.

The longitudinal platform then acts as a stabilising "bungee-guard" in order to protect the elastic cords from any impacts and cuts, and therefore contributes to the balance and the aesthetic design of the crossbow.

In relation to the rear part of the rail, it advantageously has an inverted U-shape that favours resistance to the compression and bending stresses will be applied precisely to this segment of the gun.

Also, the usual aesthetic appearance of the gun is modernised by having an inverted T section at the front part of the arrow support, and an inverted U section at the rear part.

According to one characteristic of the invention, the thrust arms have a simple, smooth surface in a cylindrical form, on which the elastic cord will be placed.

According to another advantageous characteristic of the invention, the thrust arms include one or more pulley wheels positioned in a circular or semicircular profile or in a circular arc profile.

These pulley wheels can take the form of cylinders, cones or needles.

As an example, a set of pulley wheels of needle form, measuring 1.5 mm in diameter, positioned in a circular profile allows free movement, virtually without friction, of the elastic cords tensioned on the thrust arms. The objective is to reduce the friction losses of the elastic cords during their lengthening and contraction operations.

According to one advantageous characteristic of the invention, a screw-type adjustable stop element, adjusted on the lever, allows unlocking of the retaining connecting rod when the lever is manoeuvred from the butt toward a particular position that is referred to as uncocking.

This uncocking position will preferably be capable of being maintained only by manual and temporary action on the lever.

The position of the stop screw allows partial or total unlocking of the retaining connecting rod, and in a semiautomatic manner, renders possible partial uncocking in order to modulate the power to suit the target, or total uncocking when use has ended. In both cases, uncocking is effected under the action of the traction force of the elastic cords, stretched and braked by the regulator system.

This temporary action of the lever in an uncocking position results in a return of the thrust arms to the rear on the rail, under the action of the elastic cords returning the rod inside the damping tube, in the manner of a piston in a cylinder. Emptying out of the water is effected advantageously via the rear of the damping tube, and is limited by a small orifice of a given diameter, of the order of one millimetre for example. By one quick operation, this allows a transitory return of the thrust arms to the rear of the rail, in order to visually regulate the power of the elastic cords to suit the target and its distance, and by an extended action, the complete return of the thrust arms to the rear of the rail in order to carry out manual release of the pre-cocking setting, in order to store the crossbow, when there is no further intention to fire it.

In one advantageous method of implementation, the gun includes a power regulator system which is operated by the lever arm, where the regulator system includes a damping tube fixed onto the rear part of the cocking base, and which receives the rod in the manner of a piston in a cylinder, where this damping tube is intended to be filled with water and provided with the means for controlled emptying of this water.

During uncocking, such a regulator system allows a return to the rear, slowed by the water of the mobile head part supporting the thrust arms by return of the rod inside the damping tube under the action of the traction force from the stretched elastic cords.

Such a partial uncocking is slowed by a reduced and constant emptying of the water. This emptying can occur at the front of the tube by circulation of the water around the rod, by virtue of the play between the rod and the internal diameter of the damping tube, or at the rear of the tube, via an orifice of small dimensions for example. The regulator system then allows modulation of the power, which can be seen visually, since the thrust arms move.

According to a particular characteristic, at its rear end, the damping tube is fitted with a valve for emptying the water, that is intended to be open when the lever arm is in a so-called re-cocking position, in which the retaining connecting rod is also unlocked.

With this characteristic, after the firing action, it is possible to manually and easily return the thrust arms to the rear of the rail, in order to perform a fresh pre-cocking action, by placing the elastic cords on the thrust arms and hooking them into the notch of the arrow. In fact, by putting the lever in the re-cock position, one provides for constant unlocking of the retaining connecting rod, and opening of the emptying valve that allows suspension of the braking action. The rod can then travel freely in the damping tube.

The emptying valve is preferably located at the rear end of the tube, and advantageously has a dimension of the order of magnitude of the diameter of the tube. It then totally frees the flow of the water present in the damping tube when the rod enters into the tube. This total release, with no obstruction, of the water present in the damping tube when the rod enters into it, is used to bring an end to any slowing action, to allow easy manual return of the thrust arms.

The re-cocking position is preferably rendered stable by means, for example, of a lever locking catch that can be located on the butt.

Opening of the emptying valve when the lever arm is in the re-cocking position can be controlled by means of an element located on the lever, and bearing onto on a trigger for opening the valve located on the damping tube.

The damping tube therefore has a double effect, of damping for partial or total uncocking, and release of the translation thrust arms for re-cocking the gun.

In one advantageous method of implementation, the gun includes an arrow launch ramp that includes at least two directional arrow rollers, located on the support so that the arrow is guided during its expulsion, with a minimum of friction.

Such an embodiment allows one to improve the accuracy of the firing action, which becomes stealthier by use of the directional rollers, which act as an arrow launch ramp.

The directional arrow rollers are advantageously located on the longitudinal axis of the upper part of the arrow support, at distances that match each other according to the diameter of the arrow.

The directional rollers then represent an improved launch ramp which, during the firing action, is used to optimally guide the arrow during its expulsion, with a minimum of friction and in a stealthy manner.

In a practical implementation, the underwater shotgun can be collapsed by means of a central hinge located at the level of the cocking base.

It can be seen that, according to the invention, the cocking base can incorporate all of the mechanical stresses involved, thus becoming a veritable central force unit.

In fact this then supports the resistive counter force of the elastic cords during the cocking operation on the cocking base by bilateral fixing of the first front end of the elastic cords on return from the thrust arms. It can also undergo the stresses of manoeuvring the lever during the cocking and uncocking operations, and the stresses from the thrust of the rod mating with the mobile head part translating the thrust arms. It can also be subject to the forces from a travel limiter on the thrust rod, in the form of a shoulder that advantageously acts as a stop element against the base after a full cocking operation. Finally, during partial or total uncocking, it can also be subject to the damping of the thrust rod in the double-effect damping tube, when the latter is fixed onto the cocking base.

The cocking base can thus be designed as a central force unit. In this case, the invention renders possible the articulation of the gun without prejudice to its operation. In fact, the segmentary distance of force stress on the arrow support is considerably reduced in relation to conventional crossbows. In fact, the thrust rod transfers the traction force of the elastic cords toward the cocking base, eliminating the stresses on the front part of the arrow support in the cocked position, which have previously been observed in known guns. The hinge can be placed at the end of the cocking base, toward the butt, or on the other hand can be located toward the front of the gun.

In summary, the invention concerns an underwater shotgun of the crossbow type with a force-free stretching device and a small recoil. The gun uses thrust arms that are designed to extend elastic cords. The thrust arms are placed laterally on a mobile head part, which is activated by a lever-type cocking system. The elastic cords freely pass around the thrust arms, so that first front ends of the elastic cords are fixed permanently and preferably on the base, and the second rear ends are hooked without tension into a notch of an arrow. The sliding of the mobile head part in the front segment of the arrow support intensifies the stretching of the elastic cords from the rear to the front, above and below the thrust arms, optimising the carry of the arrow when it is fired, without recoil of the crossbow, by expulsion of the arrow in the manner of a whip lash.

The crossbow also includes a power regulator and an arrow launching ramp, which ensure a stealthy firing action and one that is adaptable to suit the distance of the target.

BRIEF DESCRIPTION OF THE DRAWINGS

Other characteristics and advantages of this present invention (or of the present improvements) will appear on reading the detailed description that follows, and which is provided with reference to the appended drawings, in which.

DETAILED DESCRIPTION OF ONE EMBODIMENT

The underwater gun of the crossbow type according to the invention includes a butt 1 that includes a trigger 4 and a locking mechanism which is not shown built into the butt 1 and designed to retain the rear end of an arrow 3 when the latter is put in position and latched into the butt 1. The trigger 4 makes contact with the locking mechanism, so as to be able to release the arrow 3 and trigger its propulsion when the trigger 4 is operated. An arrow support 2 is built into the butt 1 for example. The arrow 3 is placed onto the arrow support 2.

At least two elastic cords 8 are positioned laterally on the arrow support 2. A first of their ends is fixed, by being screwed down, for example, on fixing elements 18-1, which are visible on the face of the gun shown in FIGS. 1, and 18-2, which are positioned on the other face of the gun, and not visible in FIG. 1. The fixing elements are composed, for example, of housings in lateral brackets of a cocking base 18, shown encircled with a broken line and illustrated in more detail in FIG. 4.

Alternatively, it is possible to arrange for miscellaneous types of attachment of the first end of the elastic cords 8, such as directly onto the arrow support 2 in a more-or-less median part.

The second ends, called the rear ends, of the elastic cords 8 are connected to each other by an attachment element 9 that is designed to hook into one or more notches on the arrow 3. The notches are located below rather than commonly above, for expulsion of the arrow 3 without deviation, and matched to the characteristics of the gun according to the invention.

A shell is advantageously attached to the second end of the elastic cords 8 by means of conventional screwed connections. This can also consist of balls strapped onto the attachment element 9.

Figure 1:
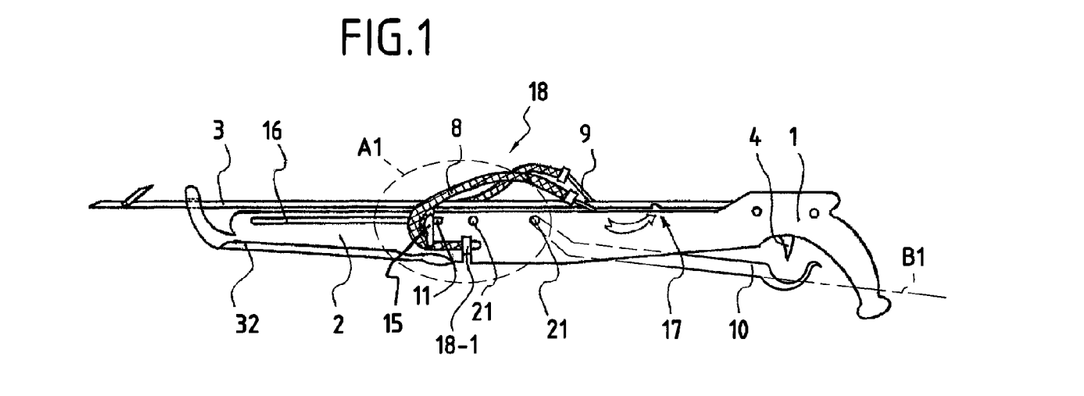
FIG. 1 is a side view of a gun according to the invention in the pre-cocked position.

The gun also includes a mobile head part 11, laterally supporting thrust arms 15. As illustrated in FIG. 1, before any cocking of the gun, the mobile head part 11 is placed in a rearward position A1 on the front part of the rail 16 of the arrow support 2.

The elastic cords 8 are then arranged so as to freely pass around these thrust arms 15 from the rear to the front above the thrust arms and from the front to the rear below the thrust arms. The first end of the elastic cords 8 is then attached to lateral fixings 18-1, 18-2 of the cocking base 18 on return from the thrust arms 15.

Pre-cocking of the attachment element 9 in a notch 17 of the arrow 3, represented in FIG. 1, can then be effected easily.

The rear part of the elastic cords 8 is then attached without tension by means of the attachment element 9 in a notch 17 of the arrow 3, when the mobile head part 11 is in the rearward position A1.

Figure 2:
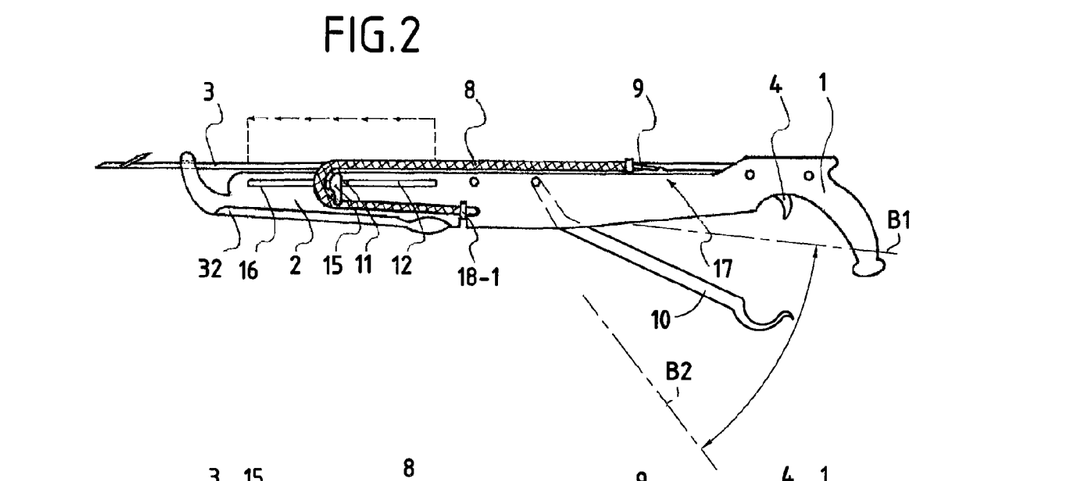
FIG. 2 is a side view of a gun according to the invention in the process of being cocked.

As illustrated in FIG. 2, in order to cock the weapon, the mobile head part 11 is then slid toward the front. The result of this is to amplify the stretching of the elastic cords 8, from the rear to the front above and below the thrust arms 15.

The thrust arms 15, fixed onto the mobile head part 11, are immobilised in the transverse direction, with a play created laterally on the rail 16, and it is then possible to execute only front and rear movements on the length of the rail 16 between a rearward position A1 and a forward position A2.

Figure 3:
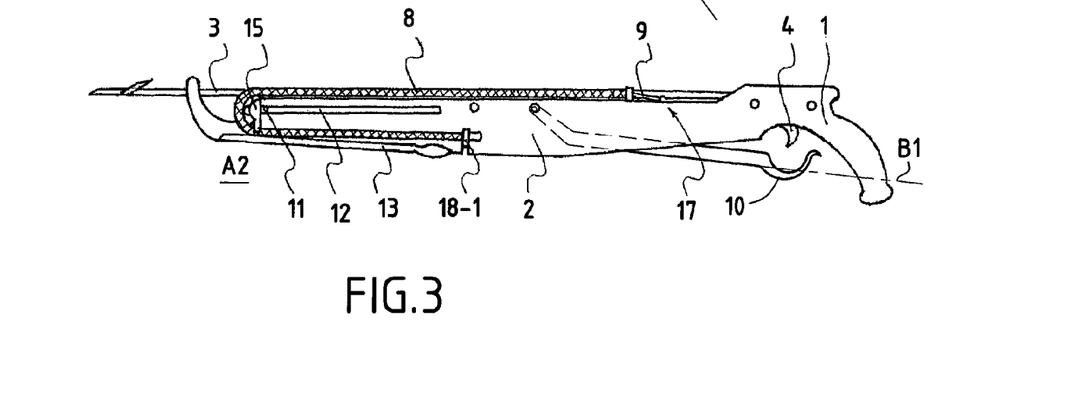
FIG. 3 is a side view of a gun according to the invention fully cocked.

A maximum lengthening or stretching of the elastic cords is thus achieved 8, as illustrated in FIG. 3, by means of a series of means which constitute a stretching device for the elastic cords 8 in combination with the mobile head part 11.

The device for stretching the elastic cords 8 includes a rod 12, attached to the mobile head part, extending parallel to the arrow support 2. This mobile rod 12 can be placed inside or outside the arrow support 2.

Figure 4:
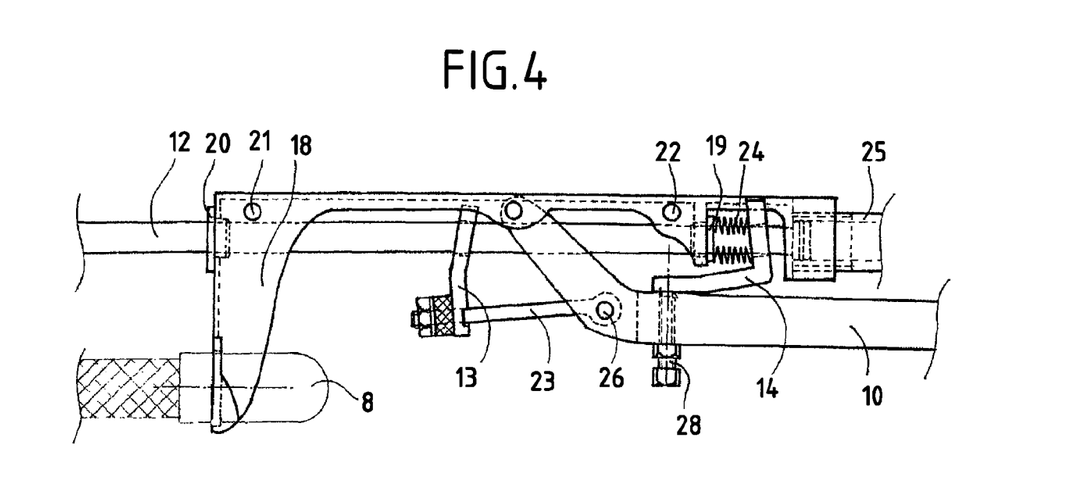
FIG. 4 represents a side view of the cocking base in which the shoulder of the mobile rod reaches an end-stop at the end of cocking, and the attachment of the first front end of the elastic cords onto the base as a resistive counter force.

As illustrated in FIG. 4, the device for stretching the elastic cords 8 uses the alternating buttressing effect of the thrust rods 13 and retention rods 14 on the rod 12, with this buttressing effect being achieved by means of a lever arm 10. The rod 12 is advantageously guided by guidance elements 19, 20.

The retaining connecting rod 14 advantageously fits onto a spring 24 that ensures its correct operation. For its part, the thrust rod 13 fits onto a drive element 23 that is fixed onto an axle 26 located on the lever arm 10. The assembly is advantageously supported by the cocking base 18 fixed to the median part of the arrow support 2, by two screws or rivets 21, 22 for example. When located in this position, the cocking base 18 forms a block with the support 2. It is advantageously designed here so as to integrate all of the mechanical stresses thus becoming a veritable central force unit.

When the lever arm 10 is pivoted between two positions B1 and B2, as illustrated in FIG. 2, the mobile head part 11 bearing the thrust arms 15, slides, in a rail 16 located on the arrow support 2, toward a forward position A2.

The lever arm 10 therefore generates movement of the thrust rod 12 attached to the mobile head part 11 that supports the thrust arms 15 on which the elastic cords 8 travel under the effect of their lengthening during the cocking action by movement of the rod 12.

Figure 8:
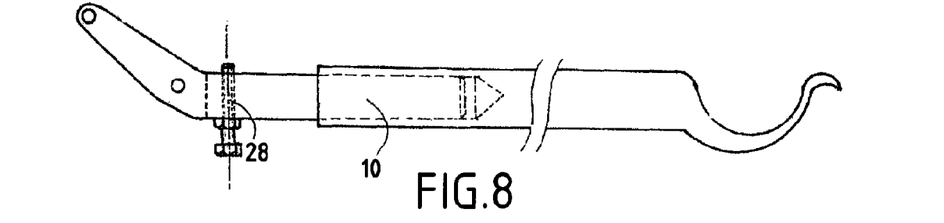
FIG. 8 represents a side view of one method of implementation of the lever arm showing the possible adjustment of the stop element unblocking the retention connecting rod.

The lever 10 can be partially or totally built into the rear segment of the arrow support. As illustrated in FIG. 8, the lever arm 10 can take the form of a "winchester" lever for example. This shape enables it to be partially recessed into the arrow support 2 when it is folded by pivoting. The lever arm 10 can be extended to the rear over a variable length that depends on the model of the gun. Its length is also dependent upon the power of the elastic cords 8. In fact it can be varied in length according to the maximum force required for cocking the gun.

The partial cocking of the arrow 3 is effected right from the first movements of the lever arm 10 represented in FIG. 2.

The total cocking of the arrow 3 is completed after executing additional manoeuvres of the lever arm 10 with no force and with a single arm, allowing the mobile head part 11 to move to a forward position A2 on the rail 16 represented in FIG. 3.

At the end of a complete cocking action, a shoulder of the rod 12 advantageously comes to a stop against the base 18, represented in FIG. 4.

Figure 5:
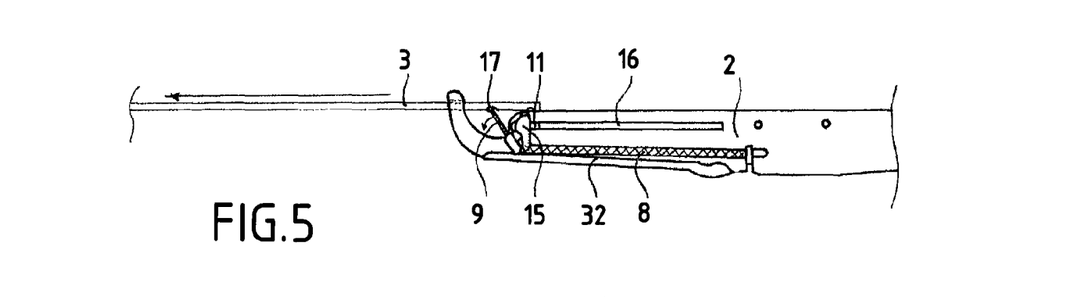
FIG. 5 illustrates the whipped expulsion of the arrow when the gun is fired.

The dimensions of the elastic cords 8 and of the attachment element 9, which may be carrying a shell, are decisive in allowing amplification of the propulsion power in the manner of a whiplash, as represented in FIG. 5. At the moment of firing, during the release of the arrow, a maximum speed is reached by instantaneous transfer of whip inertia after the total passage of the rear end of the elastic cords 8 and of the shell 9 on the thrust arms 15. The elastic cords 8 advantageously never pass below the arrow support 2. They are then stopped by the arrow support 2 at the moment of contact of the attachment element 9 with the arrow support 2.

As can be seen clearly in the figures, the invention allows the placement of the notch 17 oriented toward the arrow support 2, that is, downwards, when the gun is in the conventional position of use. Thus, the shell 9, attached to the notch 17 for example, is located below rather than commonly above the arrow. This allows expulsion of the arrow 3 without deviation during the whipped expulsion action, since the elastic cords 8 return to their initial dimensions instantaneously after total passage over the thrust arms 15 in the end of the arrow support 2. This new stretching device therefore allows total deployment of the elastic cords 8 over the whole length of the rail of the arrow support 2, thus enabling optimum accompaniment of the arrow 3, producing more power, greater carry, and higher accuracy.

Return under the thrust arms 15 and not under the arrow support 2, with the first front end of the elastic cords 8 attaching themselves to the base 18 generates a resistive counter force, during the firing action, from the front to the rear in opposition to the direction of the force of the elastic cords 8 from the rear to the front above the thrust arms 15. This has the advantage of a crossbow that exhibits "no recoil" during the firing action.

In fact, when the one fires with a conventional crossbow of any kind, one feels an undesirable but unavoidable effect, in that the crossbow reacts, and moves in the opposite direction to that of the arrow. The only thing that stops this movement is the hunter.

Any hunter will observe that the force on the hand or on the arm is mainly dependent on the mass of the arrow and the power of the elastic cords, and therefore on its speed. Fast and heavy arrows impact more on the "support" than lighter arrows.

The hunter is familiar with the recoil onto the support of the crossbow, namely the hand, arm, shoulder, etc.

It is necessary to distinguish the recoil force that acts upon the crossbow, and that is clearly identifiable, from the reaction of the support, which itself depends essentially on the characteristics of mass and stiffness of the latter.

In theory, in the case of a conventional crossbow where the arrow is propelled by a retracting action in one direction of the elastic cords, which have previously stored up the energy of the cocking action by stretching them, the longitudinal forces give rise to two forces.

One of these is applied to the notch of the arrow and directed toward the front of the support, and the other is applied to the mobile head part, to which the elastic cords are fixed, and directed in the opposite direction.

Neglecting the friction losses of the arrow, these two forces are equal in intensity but opposed to each other. It is found that the force that acts upon the arrow is equal to the force that acts upon the crossbow, or in other words action equals reaction.

Since the two forces are identical, then from the two preceding expressions, a fundamental result is drawn from the study of the recoil, namely that the product of the speed of the crossbow and the mass of the crossbow is equal to the product of the speed of the arrow and the mass of the arrow. This can be written as Q crossbow=Q arrow, where Q is the movement quantity, expressed in Kg.m/s.

More than the "recoil force", it is the movement quantity of the arrow that quantifies the effects of the recoil on the hunter. In fact, although the magnitude of the recoil force can possibly inconvenience the hunter, it will only have a slight effect on the movement of the crossbow at the beginning of the firing action, directly influenced by the movement quantity of the arrow.

In practice, the recoil is linked to the putting into movement of the arrow. The consequences of the recoil of the conventional crossbows mean that forces begin to take effect as soon as the arrow begins to move, since they necessarily induce movements of the crossbow, and they have an effect on the trajectory of the arrow. This disruption increases as the movement of the crossbow increases in magnitude and as the movement time of the arrow on the support increases—low arrow speed over large support length.

The reduction of the recoil forces to a point, such as the instantaneous point of pressure of the crossbow on the hunter for example, leads to a moment and to a force which are variable in intensity and direction with time. These forces generate movements of the crossbow that have an increasingly deleterious effect on the accuracy of the firing action as the stabilising moment, mainly from the hand and wrist, decreases.

In addition, the hand, the arm, and the shoulder are not homogeneous. During the firing action, the recoil movement of the crossbow constantly modifies the location and the characteristics of the bearing points of the crossbow. It is therefore desirable that the disruptions associated with the recoil should be incorporated into the firing action process, and compatible with the morphology of the hunter.

Recoil is therefore always annoying, and in certain cases it can also be dangerous for the hunter. This is particularly the case of certain extreme underwater hunting crossbows equipped with multiple elastic elements, and in which the recoil forces are sufficiently large to impact greatly on the hunter during the firing process, and sometimes capable of causing sprains or even fractures of the wrist and of the fingers.

The attachment, according to the invention, of the first front end of the elastic cords 8 onto the cocking base 18 results in the creation of a resistive counter force below the thrust arms 15, but not below the arrow support 2. In particular, during the firing action, the thrust arms 15, by the attachment of the first end of the elastic cords 8 returning onto the lateral fixing brackets 18-1 and 18-2 of the base 18, result in a resistive counter force that allows firing to occur without recoil.

This resistive counter force is in opposition to the propulsion force of the elastic cords 8 above the thrust arms 15 during the triggering of the firing action. This eliminates the recoil phenomena during the firing action, thereby providing more power and accuracy to the firing action.

We have seen that, according to the invention, the lever is a cocking lever for mechanical pre-cocking; but it can also be a semiautomatic uncocking lever, in particular in order to effect a precise modulation of the power.

In a semiautomatic manner, partial uncocking, depending the target, or total uncocking at the end of the fishing expedition if no shot has been fired, can be effected in a controlled manner by first unlocking the retaining connecting rod 14 by means of an adjustable stop screw 28 represented in FIG. 4.

In the embodiment proposed in FIG. 4, the lever has a threaded hole that receives the adjustable stop screw 28. This adjustable stop screw 28 is adjusted on the lever 10 so as to be active when the lever is manoeuvred from the butt 1 to a so-called uncocking position B3 represented in FIG. 6. This position B3 can be maintained only by manual and temporary action on the lever 10. The uncocking position B3 is advantageously reached by raising the lever 10 toward the butt 1 from the end of the pivoting movement of the lever 10 used for the cocking action. This position B3 is usefully marked on the cocking base or on the butt by an indicator or indeed by catches created on the pivoting path of the lever 10. For example, these catches can be created in the part of the cocking base that houses the lever 10.

In the embodiment of FIG. 4, the adjustable stop screw 28 is adjusted in order to press onto the retaining connecting rod 14, which is in the shape of an L for example, as illustrated in FIG. 4, during the manoeuvring of the lever 10 into a so-called temporary uncocking position B3. The retaining connecting rod 14 then pivots toward an unlock position, thereby releasing the movement of the rod in the longitudinal direction so that it is possible to modulate the cocking action or completely uncock the arrow by means of the lever 10.

Figure 6:
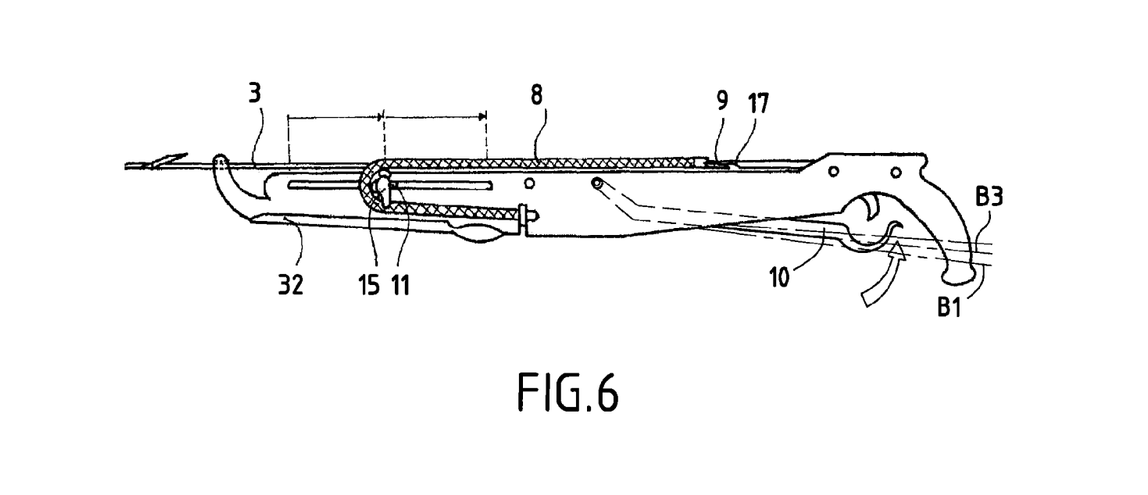
FIG. 6 is a side view of the gun according to the invention showing the partial or total semi-automatic uncocking, with the lever in a temporary uncocking position.

The temporary movement of the lever 10 to the uncocking position results in a return of the mobile head part 11 to the rear on the rail 16, pushing back the rod 12.

The gun is advantageously fitted with a regulator system with a damping tube 25 fixed onto the base 18 and in which the rod 12 is intended to slide.

During an uncocking action, the rod 12 then slides inside the damping tube 25, which is fixed in the manner of a piston in a cylinder. Removal of the water is effected advantageously via the rear of the tube 25, and is limited by a small orifice of a given diameter, of the order of one millimetre, for example.

By means of a short action, the uncocking position B3 allows a transient return of the mobile head part 11 toward the position A1 of the rail 16 in order to regulate the power of the elastic cords 8 according to the target. By means of a longer action, it also allows a complete return of the mobile head part 11 to a stop element at the rear end of the rail 16 at position A1, in order to achieve easy manual release of the pre-cocking action in order to store the crossbow.

The cocking rod 12 advantageously includes a travel limiter at its rear end, which provides it with a stop function in the form of a shoulder that bears onto the base 18 at the end of the cocking process, in order to prevent any thrust force on the front end of the rail, which could be damaged. Some play is therefore arranged between the front end of the rail and the mobile head part 11 in the most forward position of the arrow support 2, in order that it should not be the mobile head part 11 that hits onto the end of the rail under the effect of the overall thrust force.

Figure 7A:
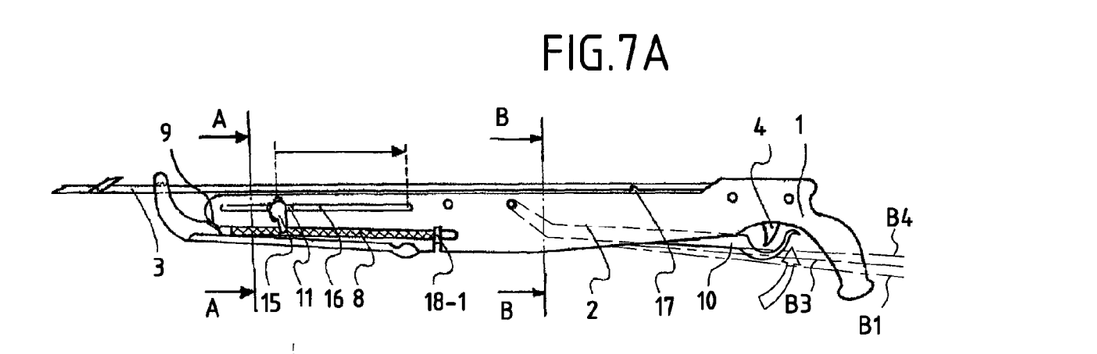
FIG. 7A is a side view of the gun according to the invention showing the easy manual return of the mobile head part supporting the thrust stretchers after the firing action in order to achieve a fresh pre-cocking by placement of the lever in a stable re-cocking position.
Figure 7B:
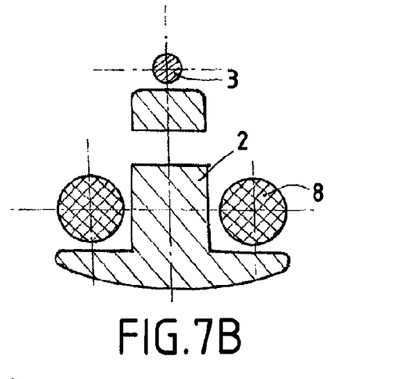
FIG. 7B is a view in section on AA in FIG. 7A, representing the base of the rail 16 in the form of an inverted T.
Figure 7C:
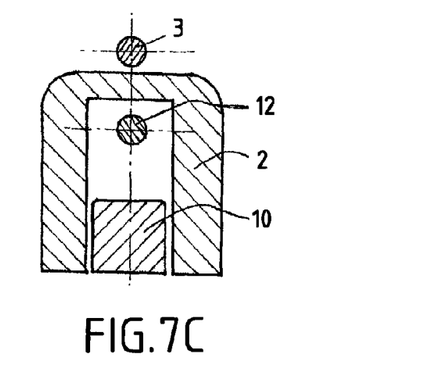
FIG. 7C is a view in section on BB of FIG. 7A, representing the shape of the rear part of the arrow support in the form of an inverted U.

The base of the rail 16 is complemented by a longitudinal platform 32, with the whole forming an inverted T, represented in FIG. 7B, which is a section along AA in FIG. 7A. This longitudinal platform 32 provides elastic protection elastic 8 against any impacts and cuts, without the elastic cords being able to pass below the arrow support 2. It favours resistance to stresses, stability, and the aesthetic appearance of the whole crossbow. The rear part of the arrow support 2 into which the cocking base 18, the rod 12, the damping tube 25, and part of the lever 10 are built, advantageously takes the form of an inverted U as represented in FIG. 7B, which is a section along CC of FIG. 7A. This provides a high degree of resistance to the various constraints.

As illustrated in FIG. 7A, after the firing action, the elastic cords advantageously do not pass below the arrow support during the firing action. Their movement is then stopped by the presence of the arrow support. As illustrated in FIG. 7A, the arrow support 2 possibly includes a special shape that is intended to accommodate the attachment element 9 on the arrow support 2.

According to the invention, once a shot has been fired, easy manual return of the thrust arms 15 to position A1 can be effected, allowing the weapon to be cocked again.

In the context of the invention, it is possible to arrange for easy manual return of the mobile head part 11 supporting the thrust arms 15 when the lever 10 is place in the so-called re-cocking position represented in FIG. 7A. The manual return of the thrust arms 15 is achieved easily by positioning the lever 10 in a so-called re-cocking position B4.

This position B4 is advantageously stable. It ensures constant unlocking of the retaining connecting rod 14, advantageously as well as the opening of an emptying valve used to suspend the controlled retention of water. This emptying valve is located at the rear end of the damping tube 25 for example, totally release the flow of the water present in the damping tube 25 when the rod 12 enters into the tube 25. It advantageously has a dimension of the order of the diameter of the damping tube.

As illustrated in FIG. 7A, the re-cocking position is provided advantageously at the travel limit of the lever arm in its pivoting movement toward the butt.

It can be seen that it could also be advantageous for positions B3 and B4 to be located alongside position B2, at the end of the maximum pivoting movement of the lever. Such choices and their implementation are within the scope of those practised in the art.

Opening the emptying valve is used to suspend the controlled retention of water in the tube 25. The emptying valve totally frees the flow of the water present in the damping tube 25 when the rod 12 enters into the tube 25.

The arrow 3 is then re-installed on the arrow support 2 by inserting the rear end of the arrow 3 in the butt 1, and then mobile head part 11 is slid manually to the rear of the rail 16 to position A1.

The elastic cords 8 can then be attached again without tension, by means of the attachment element 9, in a so-called notch 17 of the arrow 3.

In order to complete the re-cocking of the gun, a series of manoeuvres of the lever 10 are again performed in order to obtain the desired power.

Figure 9A:
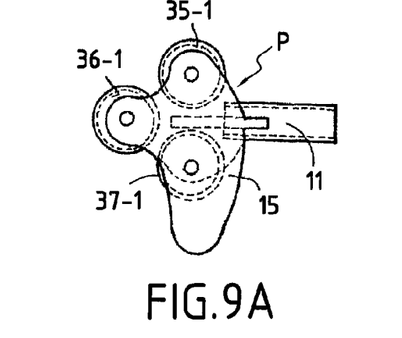
FIG. 9A represents one possible configuration of the thrust arms, using three pulley wheels in a semicircular configuration.
Figure 9B:
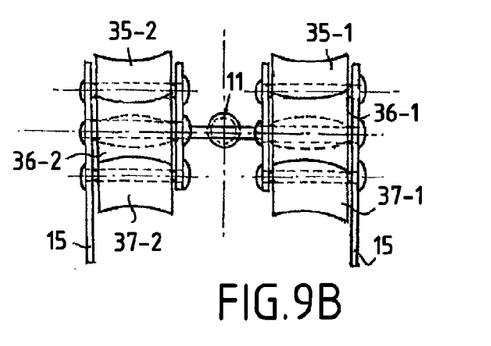
FIG. 9B is a side view of FIG. 9A.

An example of the implementation of thrust arms 15 is represented in FIGS. 9A and 9B. FIG. 9A is a side view of a thrust arm 15 with three cylindrical pulley wheels 35-1, 35-2, 35-3 placed in a triangle in a semicircular configuration in order to reduce the friction losses of the elastic cords 8 during their lengthening or their retracting action.

In FIG. 9B, representing a front view, the symmetry of the thrust arms 15 can be seen on either side of the mobile head part 11.

The choice of the different types of thrust arm is a function of the length of the crossbows to be equipped. It is particularly interesting to equip the thrust arms with one or more pulley wheels, positioned on a circular, semicircular or circular arc profile P, represented by broken lines. The diameters are chosen advantageously in a range of diameters between 1.5 mm, when the pulley wheels are usually referred to as needles, and 16 mm or even more, when a single pulley wheel is used. The pulley wheels can also be chosen to be cone-shaped or conventionally cylindrical.

The invention claimed is:

1. An underwater shotgun of the crossbow type, that includes:
    a butt (1) with a mechanism for locking the rear end of an arrow (3) and a device for releasing the said arrow (3),
    a longitudinal arrow support element (2),
    elastic propulsion means with at least two lateral elastic cords (8), one end of which is designed to be hooked into at least one notch (17) in the rear part of the arrow (3), and
    a device for stretching the lateral elastic cords (8) including:
    a cocking base (18) fixed onto the longitudinal arrow support element (2) and with fixing elements (18-1, 18-2) intended to receive the first ends of the lateral elastic cords (8); and
    a mobile head part (11) with thrust arms (15) positioned laterally on the mobile head part (11), the mobile head part (11) being designed to slide along the length of the arrow support element (2) under the action of a system for moving the mobile head part (11) between:
    a rear position (A1) which, after passing around the thrust arms (15), allows the second ends of the elastic cords (8) fixed at the cocking base (18) to be placed without tension in the notch of the arrow (3), and
    a forward position (A2) in which, when they are hooked into the notch (17) of the arrow (3), the elastic cords (8) are stretched to the maximum by a stretching movement effected, during the movement of the mobile head part (11), at an intermediate part of the elastic cords (8) passing around the thrust arms (15).

2. The underwater shotgun according to claim 1, further comprising a device for stretching the lateral elastic cords (8) such that the thrust arms (15) on the mobile head part (11) are intended to receive the lateral elastic cords (8) so that the elastic cords (8) freely pass around the thrust arms (15) from the rear to the front above, and to return from the front to the rear below, the said mobile head part (11) being designed to slide along the length of the arrow support element (2) between a rear position (A1) that allows the second ends of the elastic cords (8) fixed at the cocking base (18) and accommodated in the thrust arms (15) to be placed, without tension, in the notch (17) of the arrow (3), and a forward position (A2) in which the elastic cords (8) are stretched to the maximum when they are hooked into the notch (17) of the arrow (3) and accommodated in the thrust arms (15);

the movement system including:
- a rod (12), with the mobile head part (11) being designed to slide along the length of the arrow support element (2) by movement of the rod (12) in its longitudinal direction;
- a lever arm (10), with the lever arm (10) fits onto the rod (12) by means of a thrust and retention device that allows:

the rod (12) to be moved in the longitudinal direction under a pivoting action of the lever arm (10), and the rod (12) to be held in a forward position while the lever arm (10) is returned to its initial position by reverse pivoting, so that it is then possible to achieve the stretching of the elastic cords (8) by sliding the mobile head part (11) between the rear position (A1) and the front position (A2), effecting at least one pivot operation of the lever arm (10).

3. The underwater shotgun according to claim 2, wherein the thrust and retention device includes thrust connecting rods (13) and retention connecting rods (14) of the rod (12) by effecting an alternating buttressing effect on the rod (12) by pivoting of the lever (10).

4. The underwater shotgun according to claim 3, wherein an adjustable stop screw (28), adjusted on the lever (10), allows unlocking of the retaining connecting rod (14) when the lever (10) is manoeuvred from the butt (1) toward a particular position known as the uncocking position (B3).

5. The underwater shotgun according to claim 2, wherein the rod (12) is designed to move in its longitudinal direction in a manner parallel to the longitudinal direction of the longitudinal arrow support element (2) pushing the mobile head part (11).

6. The underwater shotgun according to claim 1, wherein the gun includes a power regulator system operated by the lever arm (10), where the regulator system includes a damping tube (25) fixed onto the rear part of the cocking base (18) and that accommodates the rod (12) in the manner of a piston in a cylinder, the damping tube (25) being intended to be filled with water and having the means for controlled emptying of this water.

7. The underwater shotgun according to claim 6, wherein, at its rear end, the damping tube (25) has a valve for emptying the water, which is intended to be opened when the lever arm (10) is in a position known as re-cocking (B4), in which the retaining connecting rod (14) is also released.

8. The underwater shotgun according to claim 1, wherein the dimensions of the elastic cords (8) are matched to the distance between the fixing (18-1, 18-2) of the first end of the elastic cords (8) and the thrust arms (15), so that, at the moment of expulsion of the arrow (3), the elastic cords (8) return to their initial dimensions at rest, just after total passage over the thrust arms (15).

9. The underwater shotgun according to claim 1, wherein the gun is such that the notch (17) on the arrow (3) is oriented toward the longitudinal arrow support (2) when the arrow (3) is inserted into the gun.

10. The underwater shotgun according to claim 1, wherein the mobile head part (11) is designed to slide on a rail (16) located in the front segment of the arrow support element (2) between the rear position (A1) that allows the elastic elements to be placed without tension in the notch, and the forward position (A2) in which the elastic cords are stretched to the maximum when they are hooked into the notch, so that cocking the elastic cords occurs parallel to the said arrow support and to the arrow.

11. The underwater shotgun according to claim 10, wherein the rail (16) is composed of a single tube or multiple tubes, either hollow or solid.

12. The underwater shotgun according to claim 1, wherein the thrust arms (15) have a simple smooth surface in a form that is at least partially cylindrical, and on which the elastic cord is placed.

13. The underwater shotgun according to claim 1 wherein the thrust arms (15) include one or more pulley wheels (35-1, 36-1, 37-1, 35-2, 36-2, 37-2) chosen from pulley wheels of cylindrical, conical or needle shape, positioned according to a circular or semicircular profile or in a circular arc profile (P).

14. The underwater shotgun according to claim 1, wherein the gun includes an arrow launch ramp (3) with at least two directional arrow rollers located on the support (2), so that the arrow (3) is guided during its expulsion with a minimum of friction.

15. The underwater shotgun according to claim 1, wherein the underwater shotgun is rendered collapsible, by means of a central hinge located at the cocking base (18).

* * * * *